C. W. DAKE.
ADJUSTABLE HUB PLATE.
APPLICATION FILED JULY 21, 1919.
1,397,084.
Patented Nov. 15, 1921.
3 SHEETS—SHEET 3.
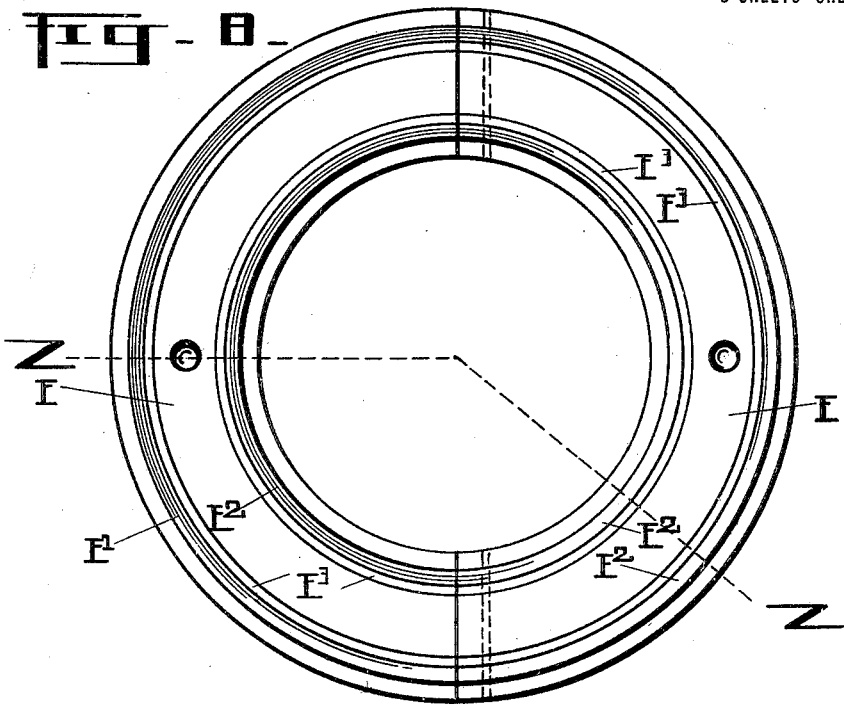
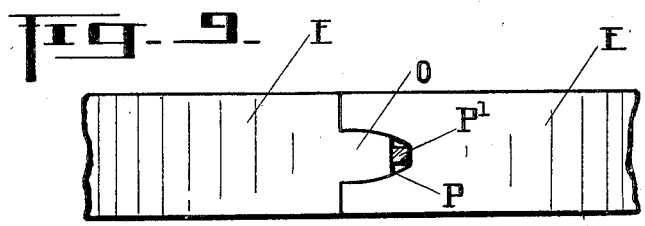
INVENTOR
Charles W Dake
BY Parker & Carter
ATTORNEYS

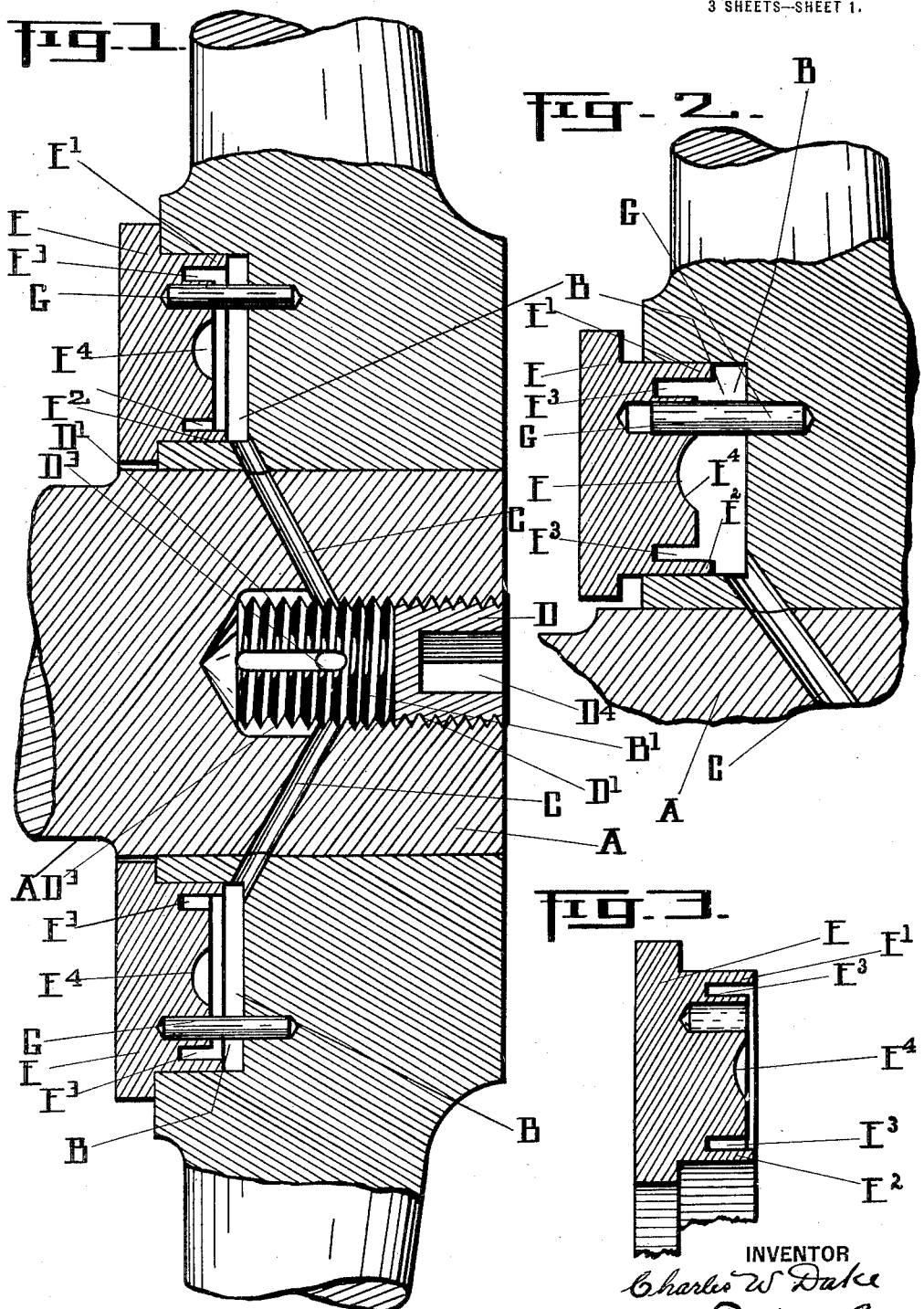

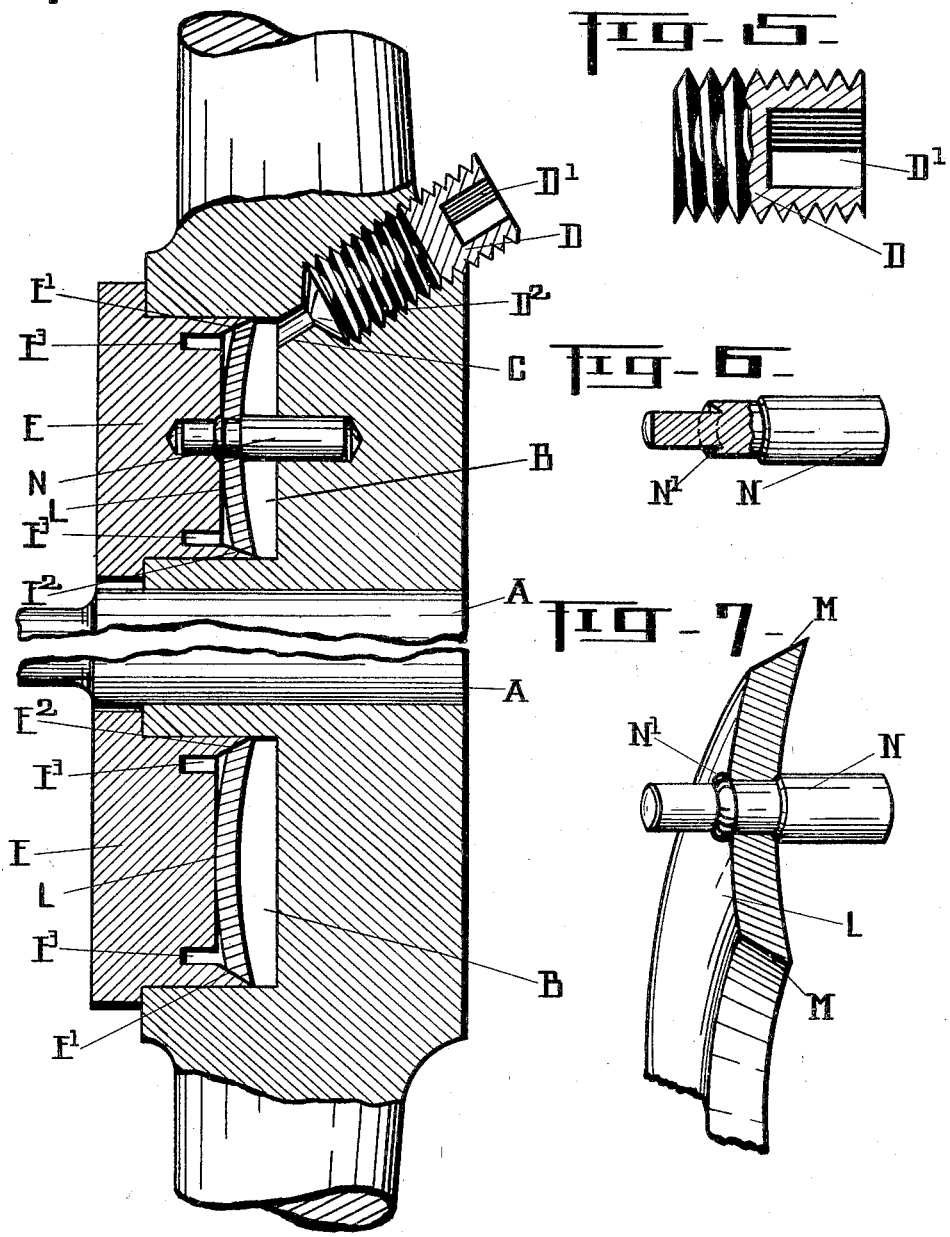

UNITED STATES PATENT OFFICE.

CHARLES W. DAKE, OF CHICAGO, ILLINOIS, ASSIGNOR TO SMITH LOCOMOTIVE ADJUSTABLE HUB COMPANY, OF CHICAGO, ILLINOIS, A CORPORATION OF ARIZONA.

ADJUSTABLE HUB-PLATE.

1,397,084.   Specification of Letters Patent.   Patented Nov. 15, 1921.

Application filed July 21, 1919. Serial No. 312,266.

*To all whom it may concern:*

Be it known that I, CHARLES W. DAKE, a citizen of the United States, residing at Chicago, in the county of Cook and State of Illinois, have invented a certain new and useful Improvement in Adjustable Hub-Plates, of which the following is a specification.

My invention relates to means for advancing the wearing plate associated with a hub, particularly such as the wearing plate of the hub of a locomotive. The invention has for its object to provide means whereby a portion of the plate can be deformed so as to lock into the expansion chamber the grease which is applied to advance the plate to take up for the wear. It is illustrated in the accompanying drawings wherein—

Figure 1 is a cross section of a hub and axle of a locomotive wheel showing my invention applied thereto;

Fig. 2 is an enlarged detail cross section;

Fig. 3 is a detail cross section through a portion of the wearing plate;

Fig. 4 is a cross section similar to Fig. 1 with a modification;

Fig. 5 is a detail of the grease plunger;

Figs. 6 and 7, details of the annulus centering device.

Figs. 8 and 9 are details of the plate and the connection joint of its two parts;

Fig. 10 is a detail of the annulus.

Like parts are indicated by the same letter in all the figures.

A is the hub having the annular recess B with channels CC leading thereto.

D is the grease plunger screw threaded at $D^1$ into a central recess $B^1$ so as to engage with the screw threads $D^2$ in the recess in the axle and provided with longitudinal slots $D^3$. $D^4$ is a squared recess in the end of the grease plunger for the admission of a plug wrench.

E is the wearing plate provided with the outer downwardly depending relatively thin flanges $E^1$ and $E^2$, and a central projecting part, which with the two flanges, forms two annular chambers $E^3E^3$ and which is provided with the groove $E^4$.

GG are dowel-pins let respectively into the holes in the bottom of the recess of the hub and into the inner central portion of the wearing plate to prevent the wearing plate from rotating on the hub. The wearing plate is composed of two parts as indicated in Fig. 8 and the two parts are preferably dove-tailed together at their meeting edges as indicated at P and in the channel between these meeting edges may be interposed the packing $P^1$. In the modification, the grease plunger is set as indicated in Fig. 4 at one side of the hub. An annulus L of relatively thin material, is interposed between the bottom of the recess of the hub and the inner surface of the wearing plate. This plate preferably has beveled edges MM and the inner surfaces of the flanges $E^1$ and $E^2$ may be shaped to accommodate themselves to the shape of the edge of the annulus. The annulus is, of course, made in two sections and it is perforated at $M^2$. I employ a securing pin N which is received into a hole in the bottom of the recess in the hub and is reduced in size at $N^1$ and received into the hole $N^2$ in the annular plate. The annular plate is normally disk shaped in cross section as indicated in Figs. 4 and 7 and it is held in proper relation to the hub by the securing pin, the farther extremity of which beyond the plate, projects into a hole in the back of the wearing plate, thus holding the latter from rotation. The securing pin performs the double function of preventing rotation of the wearing plate on the hub and holding the annular plate in proper position.

It will be understood, of course, that I do not wish to be limited to the specific form, structure and arrangement of parts shown and that various modifications may be made without departing from the spirit of my invention. My drawings are in a sense, diagrammatic.

O is the tongue between the ends of the plates. P is the groove to receive the tongue, $P^1$ constituting packing means.

The use and operation of my invention are as follows:—

Assuming that the parts are in the position indicated in Fig. 1 and that the surface of the plate E has become so far worn and reduced that it is necessary or desirable to take up to accommodate for such wear, the operation is performed without removing the wheel from the axle by means of the apparatus hereinbefore described. The grease plunger D is withdrawn by a suitable socket wrench and the recess in the axle or hub is supplied with grease. The grease plunger is then returned to position and screwed down upon the grease so that the latter is driven out through the channels CC or into the expansion chamber in the recess in the hub. By applying pressure to the grease plunger, the grease will be forced under great pressure into such expansion chamber and down into the annular channels formed by the flanges and the central portion of the back of the wearing plate. The result will be that responsive to such pressure, the flanges will be slightly deformed or pressed outward so as to make a very firm contact between the inwardly projecting portion of the wearing plate and the walls of the recess on the side of the hub, and thus the grease will be prevented from escaping or will be locked into the expansion chamber. The wearing plate will be moved by the pressure of the grease or advanced so far as may be necessary and then it will be locked in position and the grease locked within the expansion chamber by the deformation of the flanges on the plate.

In the modification of Fig. 4, the annular plate serves as intermediary between the grease and the flanges to cause the grease to deform the flanges as indicated and for the purpose set forth.

I have used the word "grease" to refer to the material which is forced into the expansion chamber but it is obvious that any substance which will act in the same general manner as grease, would serve the purpose and there are various kinds of fluids, liquids and solids in a kind of fluid state which might be used with greater or less success. By the expression "grease" as here used, I mean to include all such equivalently acting substances. The packing between the ends of the sections of the wearing plate should be compressible and is preferably of some soft metal such as copper.

I have spoken of the hub as having an annular recess but it may easily be understood that the same effect would be obtained by having a flange, plate or ring properly disposed and it will also be understood that the recess could be in the plate and the other projecting parts on the hub. It will also be understood that the recess, as to some features of the invention, might be dispensed with entirely and in such case, the word "recess" as I use it in the claims, should be understood to refer only to the contacting parts or opposed parts of the plate and hub, although the recess, whether placed on the plate or away, is so minute as to be negligible or entirely dispensable.

I have spoken of this device as an adjustable hub plate, but, of course, it is perfectly obvious that the word "hub" may here be taken in a broad sense to include any or all parts against which the plate bears and while I have contemplated the application of my invention to the hub of locomotive wheels, it might be used with any other device where such an adjustable plate is desired. The word "hub" therefore, is to be understood as anything which in effect would be the bearing part against which the plate abuts.

I claim:

1. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising two annular flanges about the outer surface of that part of the plate which projects within the hub recess.

2. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising two annular flanges about the outer surface of that part of the plate which projects within the hub recess, and deep annular grooves immediately back of said flanges.

3. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, and an expansion plate within such deformation parts.

4. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, and means for holding the plate from rotation on the hub, and an expansion plate within such deformation parts.

5. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising two annular flanges about the outer surface of that part of the plate which projects within the hub recess, and an expansion plate within said deformation parts.

6. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising two annular flanges about the outer surface of that part of the plate which projects within the hub recess, and deep annular grooves immediately back of said flanges, and an expansion plate within such deformation parts.

7. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said means for supplying grease under pressure consisting of a screw threaded grease plunger and a channel leading thence to the chamber between the plate and hub.

8. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, and means for holding the plate from rotation on the hub, said means for supplying grease under pressure, consisting of a screw threaded grease plunger and a channel leading thence to the chamber between the plate and hub.

9. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising two annular flanges about the outer surface of that part of the plate which projects within the hub recess, said means for supplying grease under pressure, consisting of a screw threaded grease plunger and a channel leading thence to the chamber between the plate and hub.

10. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising two annular flanges about the outer surface of that part of the plate which projects within the hub recess, and deep annular grooves immediately back of said flanges, said means for supplying grease under pressure consisting of a screw threaded grease plunger and a channel leading thence to the chamber between the plate and hub.

11. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said means for supplying grease under pressure consisting of a screw threaded grease plunger and a channel leading thence to the chamber between the plate and hub, said grease plunger located in the axle.

12. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, and means for holding the plate from rotation on the hub, said means for supplying grease under pressure, consisting of a screw threaded grease plunger and a channel leading thence to the chamber between the plate and hub, said grease plunger located in the axle.

13. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising two annular flanges about the outer surface of that part of the plate which projects within the hub recess, said means for supplying grease under pressure, consisting of a screw threaded grease plunger and a channel leading thence to the chamber between the plate and hub, said grease plunger located in the axle.

14. The combination of a hub, having an annular recess on one side, with a wearing plate having a portion adapted to be received into said recess and shaped so that the part which contacts the inner wall of the recess is capable of deformation to grip such wall, and means for introducing grease under pressure into the chamber formed between the hub and plate, so as to advance and hold the wearing plate to accommodate for wear and to press the deformation part of the plate against the walls of the hub recess to close the chamber against the escape of grease, said deformation part comprising of two annular flanges about the outer surface of that part of the plate which projects within the hub recess, and deep annular grooves immediately back of said flanges, said means for supplying grease under pressure consisting of a screw threaded grease plunger and a channel leading then to the chamber between the plate and hub, said grease plunger located in the axle.

15. The combination of a hub, having an annular recess on one side, with a wearing plate having a portion adapted to be received into said recess and shaped so that the part which contacts the inner wall of the recess is capable of deformation to grip such wall and prevent movement of the wearing plate in relation thereto, and means for introducing grease under pressure into the chamber formed between the hub and plate, so as to advance and hold the wearing plate to accommodate for wear and to press the deformation part of the plate against the walls of the hub recess to close the chamber against the escape of grease, and an expansion plate within such deformation parts.

16. The combination of a hub having an annular recess on one side, with a sectional wearing plate having a portion adapted to be received into said recess and shaped so that the part which contacts the inner wall of the recess is capable of deformation to grip such wall and prevent movement of the wearing plate in relation thereto, and an expansion plate within such deformation parts.

17. The combination of a hub having an annular recess on one side, with a sectional wearing plate having a portion adapted to be received into said recess and shaped so that the part which contacts the inner wall of the recess is capable of deformation to grip such wall and prevent movement of the wearing plate in relation thereto, and a sectional expansion plate within such deformation parts.

18. The combination of a hub having an annular recess on one side, with a sectional wearing plate having a portion adapted to be received into said recess and shaped so that the part which contacts the inner wall of the recess is capable of deformation to grip such wall, and a sectional expansion plate within such deformation parts, said wearing plate and expansion plate joints staggered with reference to each other.

19. The combination of a hub having an annular recess on one side, with a sectional wearing plate having a portion adapted to be received into said recess and shaped so that the part which contacts the inner wall of the recess is capable of deformation to grip such wall, and a sectional expansion plate within such deformation parts, and means for preventing the two plates from rotating with reference to each other.

20. The combination of a hub having an annular recess on one side, with a sectional wearing plate having a portion adapted to be received into said recess and shaped so that the part which contacts the inner wall of the recess is capable of deformation to grip such wall, and a sectional expansion plate within such deformation parts, said wearing plate and expansion plate joints staggered with reference to each other, and means for preventing the two plates from rotating with reference to each other.

In testimony whereof, I affix my signature in the presence of two witnesses this 16th day of July, 1919.

CHARLES W. DAKE.

Witnesses:
 EDITH L. PORTER,
 MILDRED H. MACKE.